United States Patent [19]

Koivunen

[11] Patent Number: 5,046,997
[45] Date of Patent: Sep. 10, 1991

[54] TWO-STAGE FINAL DRIVE

[75] Inventor: Erkki A. Koivunen, Livonia, Mich.

[73] Assignee: General Motors Corporation, Detroit, Mich.

[21] Appl. No.: 571,813

[22] Filed: Aug. 24, 1990

[51] Int. Cl.$^5$ .............................................. F16H 1/44
[52] U.S. Cl. ................................................. 475/221
[58] Field of Search ................. 475/84, 221, 231, 249, 475/330

[56]  References Cited

U.S. PATENT DOCUMENTS

| 2,700,311 | 1/1955 | Bade | 475/330 |
|---|---|---|---|
| 4,114,478 | 9/1978 | Clauss | 74/781 |
| 4,412,459 | 11/1983 | Gorcenski, Jr. | 475/221 X |
| 4,589,304 | 5/1986 | Ashikawa et al. | 475/249 X |
| 4,612,824 | 9/1986 | Rühle | 475/249 X |
| 4,779,699 | 10/1988 | Hatano | 475/221 X |
| 4,976,670 | 12/1990 | Klemen | 475/330 X |

FOREIGN PATENT DOCUMENTS 952861  3/1964  United Kingdom .

Primary Examiner—Allan D. Herrmann
Assistant Examiner—Ryan W. Massey
Attorney, Agent, or Firm—Donald F. Scherer

[57] ABSTRACT

A two-stage final drive selectively provides two gear ratios between a transmission output member and the final drive or differential in a vehicle driveline. The two-stage final drive utilizes a planetary gear arrangement having a plurality of stepped pinion gears meshing with an input sun gear and two selectively brakeable ring gears. The planet carrier is connected with the input to a differential gear arrangement. The stepped pinion planetary gear arrangement provides two underdrive ratios and has operatively connected to one of the reacting ring gears, a dual mode roller clutch which is selectively controlled to provide a path to ground in two directions when the transmission is conditioned for Park, Reverse or Neutral, and a path to ground in one direction during the operation of the transmission in the forward direction. The dual mode device will permit forward rotation of the low speed ring gear when the high speed ring gear is selected as the reaction member. The dual mode member permits a conventional parking brake arrangement to be utilized by the transmission. As an alternative to the dual mode device, a more conventional one-way device in combination with a selectively operable mechanical one-way brake arrangement can be utilized in the two-stage final drive.

6 Claims, 4 Drawing Sheets

| MODE | LOW ROLLER BRAKE | | LOW OVERRUN BAND | HIGH BRAKE |
|---|---|---|---|---|
| | PARK/REV MODE | DRIVE MODE | | |
| PARK | ON | | OFF | OFF |
| REVERSE | ON | | ON OR OFF | OFF |
| NEUTRAL | | | ON OR OFF | OFF |
| FIRST | | | ON | OFF |
| SECOND | | | ON | OFF |
| THIRD | | | ON | OFF |
| FOURTH | | ON | OFF | ON |
FIG 6
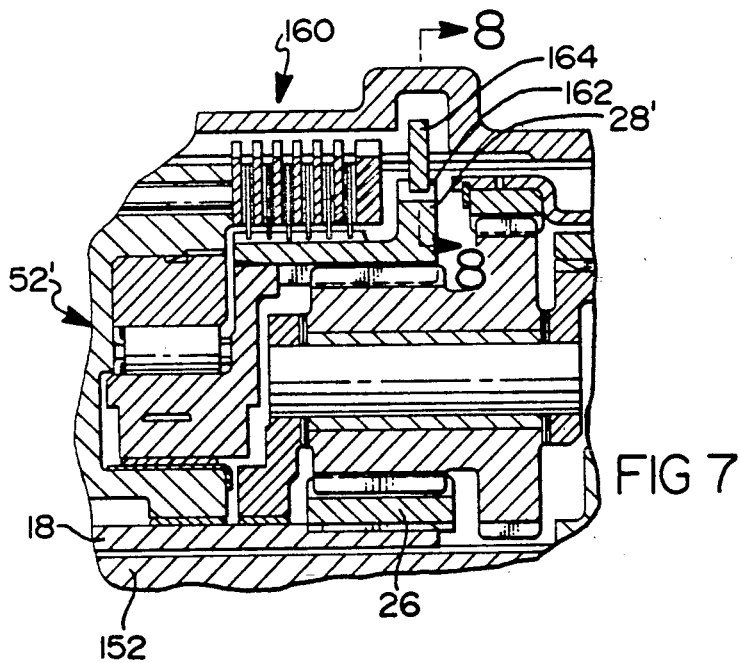
FIG 7
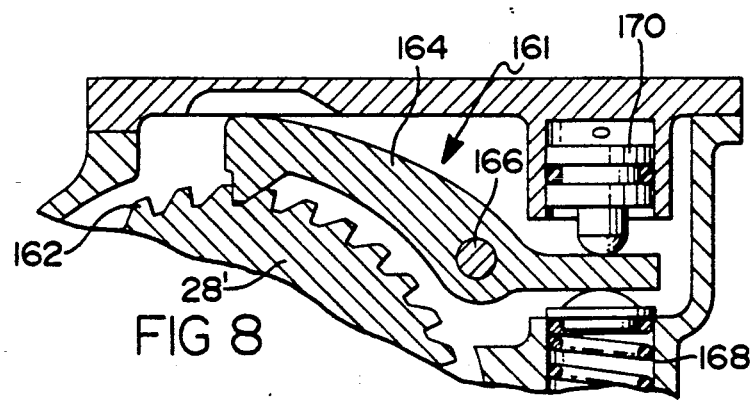
FIG 8

5,046,997

TWO-STAGE FINAL DRIVE

BACKGROUND OF THE INVENTION

This invention relates to final drive arrangements for a power transmission, and more particularly, to such final drive arrangements wherein two speed ratios are provided within the final drive.

SUMMARY OF THE INVENTION

The present invention provides a two-speed final drive arrangement which can be incorporated into many existing vehicle powertrains between the transmission output and the differential gear unit input. With the present invention, two underdrive gear ratios are provided through the use of a stepped pinion planetary gear arrangement having a sun gear input, two ring gear reaction elements and a carrier output.

The ring gear which provides reaction for the lowest of the two-speed ratios is controlled by both a roller brake and a selectively engageable friction brake. The friction brake will, of course, provide reaction force independent of the direction of rotation. The roller brake in the preferred embodiment has a selectively operable control element which permits the roller brake to be operable independently of the direction of rotation of the reaction member. Thus, the roller brake can provide a reaction member whenever the transmission is conditioned for Park, Reverse, Neutral or forward drive operation.

However, to attain the higher of the two-speed ratios provided by the two-stage final drive, the roller brake must permit overrunning during the selection of the higher ratio. This is accomplished by providing control springs disposed to abut each roller thereby preventing the normal camming action associated with one-way roller devices. To permit or enforce the camming action in both directions of rotation, the control spring is manipulated to a position wherein the outer surface of the roller is abutted tangentially by the spring at the point of contact with the cam surface, thereby limiting the circumferential movement of the rollers relative to the cam surface.

By utilizing the dual mode roller brake, the conventional park brake mechanism can be utilized in the transmission such that engagement between a brake pawl in the final drive differential carrier is not required. The use of a two-stage final drive will benefit a three or four speed automatic transmission by increasing the ratio coverage without requiring a design change of the gear ratios and elements found in the three or four speed transmission. The aided ratio coverage permits the transmission to be utilized with existing engines and transmission combinations with a wider variety of vehicles.

It is also possible to provide a selectively engageable mechanical one-way brake arrangement enclosed within the two-stage final drive without changing the design configuration of the final drive differential utilized in transmissions incorporating the two-stage final drive. In this arrangement, the mechanical one-way brake arrangement is formed directly on the outer surface of the low ratio reaction ring. During operation, this one-way brake arrangement prevents forward rotation of the reaction member. This arrangement, operating in concert with the conventional transmission park gear arrangement will be effective to maintain the vehicle stationary whenever Park operation is selected by the operator. This arrangement preferably uses a hydraulic release spring apply system.

It is therefore an object of this invention to provide an improved final drive arrangement design for disposition between a transmission output shaft and a gear differential input, wherein a compound planetary unit having stepped pinion gears is controlled to provide two drive ratios.

It is another object of this invention to provide an improved final drive arrangement disposed between a transmission output member and a differential input member, wherein a planetary gear arrangement incorporates an input sun gear and two selectively operable reaction ring gears to establish two underdrive ratios, and further wherein, one of the ring gear members has operatively connected therewith a selectively controllable roller brake mechanism for providing two-way braking whenever the transmission output is in a Low or Reverse operating mode and an overrun condition when the other reaction ring gear of the final drive arrangement is selectively retarded to provide a high speed ratio.

It is yet another object of this invention to provide an improved two-stage final drive arrangement, as described in the preceding object, wherein the selectively operable roller brake mechanism will establish a reaction member within the two-stage final drive arrangement whenever the transmission is conditioned for Park, Reverse, Neutral or Low gear operation.

These and other object and advantages of the present invention will be more readily apparent from the following description and drawings.

DESCRIPTION OF THE DRAWINGS

FIG. 6 is a chart showing the condition of the brakes during various operating modes.

FIG. 7 is a sectional view showing another embodiment of a two-stage final drive arrangement constructed in accordance with the present invention.

FIG. 8 is a view taken along line 8—8 of FIG. 7.

DESCRIPTION OF THE PREFERRED EMBODIMENT

Figure 1:
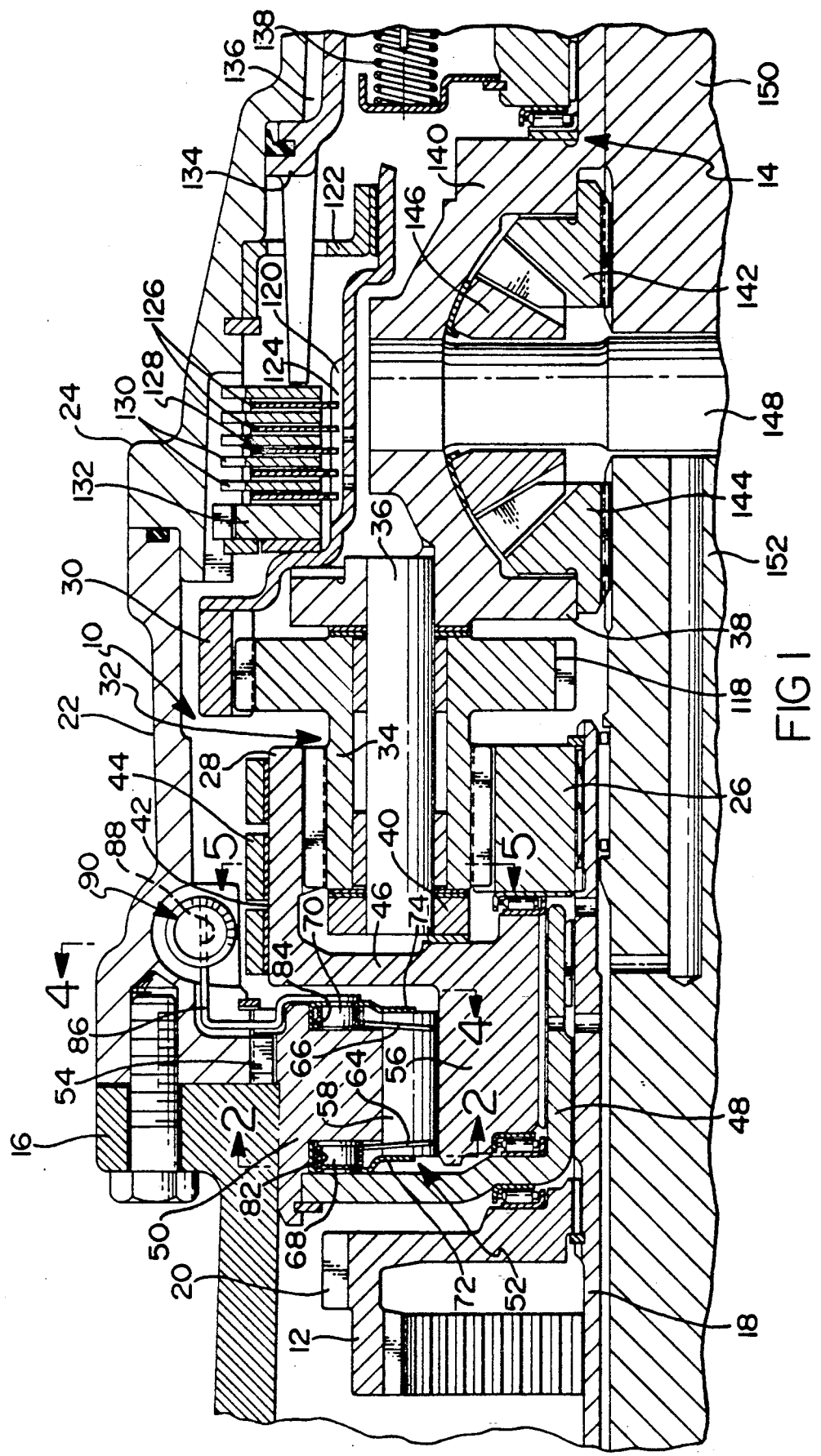
FIG. 1 is a sectional view of a portion of a transmission and differential incorporating the embodiment of a two-stage final drive arrangement constructed in accordance with the present invention.

Referring to the drawings, wherein like characters represent the same or corresponding parts throughout the several views, there is seen in FIGS. 1 through 5, a two-speed final drive or planetary arrangement 10 disposed between a transmission output member 12 and a differential gear assembly 14. The arrangement output member 12 is a component in a conventional three speed automatic transmission, such as that shown in U.S. Pat. No. 4,223,569 issued to Koivunen et al. Sept. 23, 1980, and assigned to the assignee of the present invention.

The transmission includes a housing or casing 16 in which the transmission components, not shown, are enclosed and a transmission output shaft 18 which is drivingly connected with the transmission output member 12. The transmission output member 12 has a conventional park gear 20 formed on the outer surface thereof which is selectively engaged in a well-known manner by a conventional parking pawl, not shown.

The extension housing 22 is secured to the transmission housing 16 and also to an end cover or differential housing 24. The two-speed planetary gear arrangement is disposed mainly within the extension housing 22 and includes a sun gear 26, a pair of ring gears 28 and 30, and a planet carrier assembly 32. The planet carrier assembly 32 is comprised of a plurality of stepped pinions 34, each of which is rotatably journalled on a pinion pin 36 secured in a pair of planet carrier side plates 38 and 40. The sun gear 26 is drivingly connected to the transmission output shaft 18 for continuous rotation therewith thereby establishing an input member for the two-speed planetary arrangement 10.

The ring gear 28 has an outer drum surface 42 which is encircled by a conventional double wrap band 44. The ring gear 28 also has a hub portion 46 which is rotatably supported on a support member 48, which in turn is secured to the extension housing 22 through an outer race 50 of a one-way brake 52. The outer race 50 is splined to the extension housing 22 at 54 so as to be rotatably fixed thereto.

Figure 2:
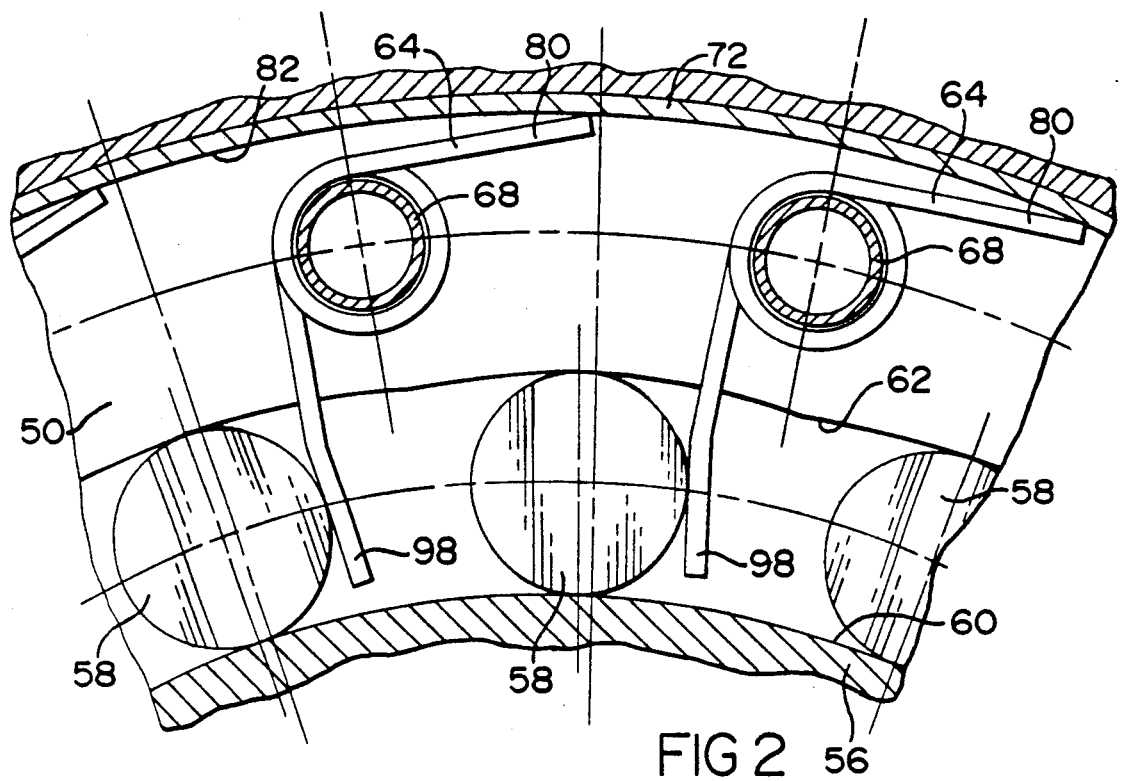
FIG. 2 is a view taken along line 2—2 of FIG. 1 showing a portion of a dual mode roller clutch in one operating condition.
Figure 3:
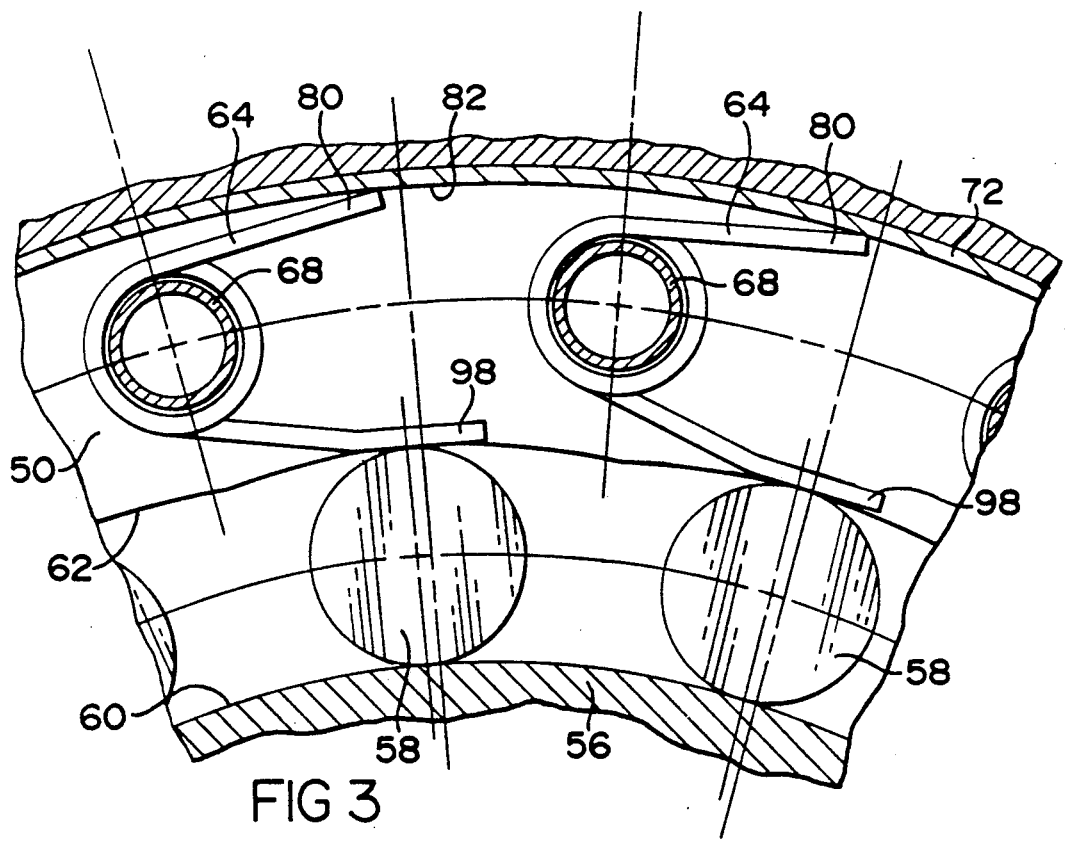
FIG. 3 is a view similar to FIG. 2 showing the dual mode roller clutch in another operating condition.
Figure 4:
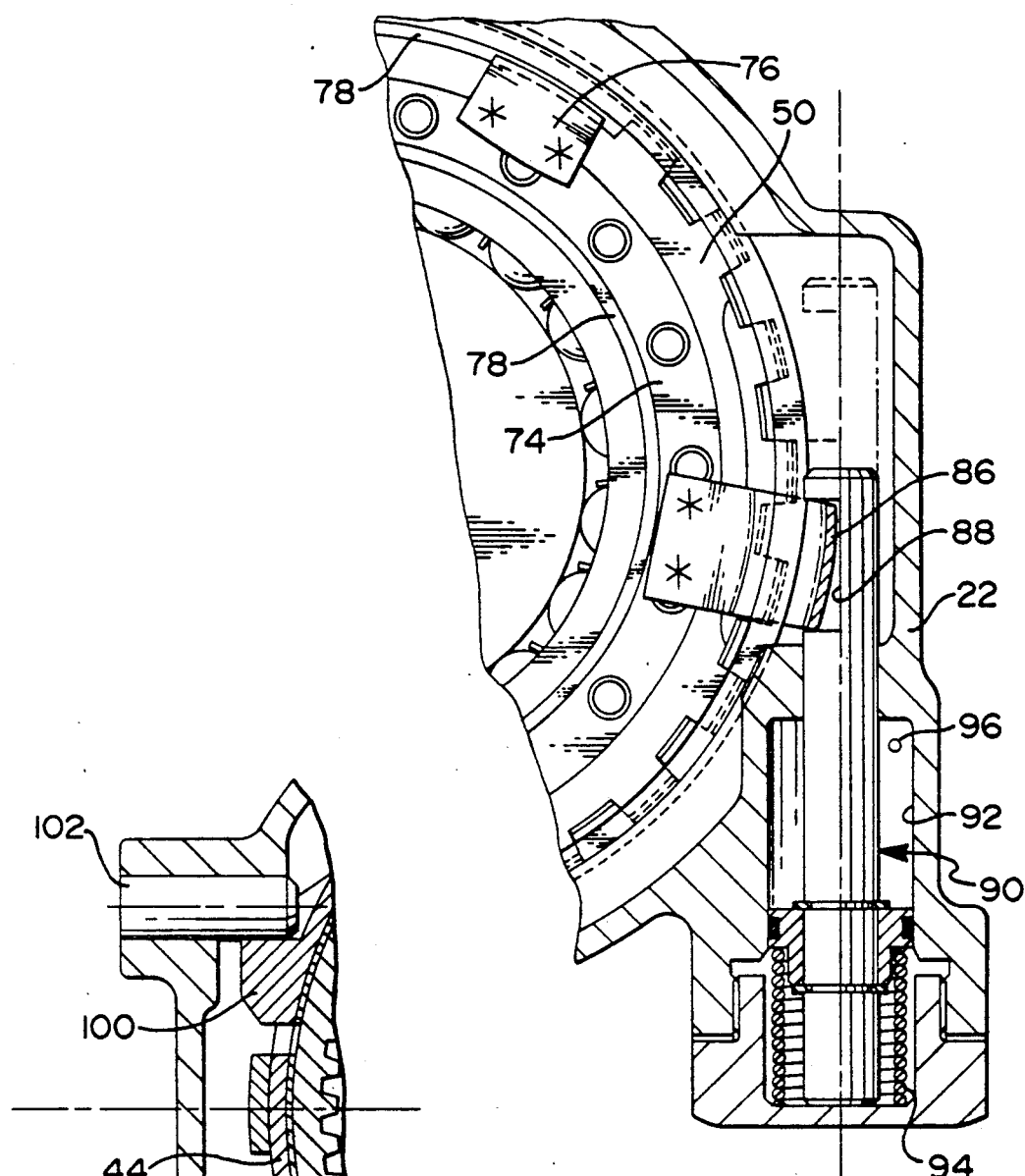
FIG. 4 is a view taken along line 4—4 of FIG. 1.

The hub 46 of the ring gear 28 also provides an inner race 56 for the one-way brake 52. A plurality of rollers 58 are disposed between the inner race 56 and outer race 50. As best seen in FIGS. 2 and 3, the inner race 56 has a smooth cylindrical surface 60 in contact with the rollers 58 and the outer race 50 has a cam surface 62 disposed in contact with the rollers 58.

A plurality of finger springs or torsion springs 64 and 66 are rotatably journalled on support posts 68 and 70, respectively, which in turn are secured to retainer plates 72 and 74. The retainer plates 72 and 74 are interconnected by a plurality of bridging plates 76, which pass through openings 78 formed in the outer surface of the outer race 50. Each spring 64 and 66 has an extension, such as 80, shown in FIGS. 2 and 3, which abut a wall 82 formed in the retainer plate 72, or a wall 84 formed in the retainer plate 74.

The retainer plate 74 has a drive plate 86 secured thereto and extending radially outward from the outer race 50. The drive plate 86 is retained in a notch 88 formed in a control piston 90 which is slidably disposed in a cylinder 92 formed in the extension housing 22. The piston 90 is urged upward, as viewed in FIG. 4, by a spring 94 and downward to the position shown by fluid pressure selectively admitted in a conventional manner through passage 96 to the cylinder 92.

In the pressure set position shown, the retainer plates 72 and 74 are positioned to provide the spring position, shown in FIG. 2, wherein the control finger 98 of each spring is positioned to prevent the rollers from causing braking operation between the inner and outer races when the inner race is rotated in the clockwise direction when viewed in FIG. 2. However, when the inner race 56 is rotated in the counterclockwise direction, the rollers 58 will engage in the cam surface 62, such that the inner race 56 will be held stationary. This corresponds to forward rotation of the ring gear 28. Forward rotation of the ring gear 28 will occur whenever the transmission output shaft 18 and therefore sun gear 26 are rotated in the reverse direction. Forward and reverse rotational directions refer to the direction of vehicle travel as determined by the gear ratio selected in the transmission.

Figure 5:
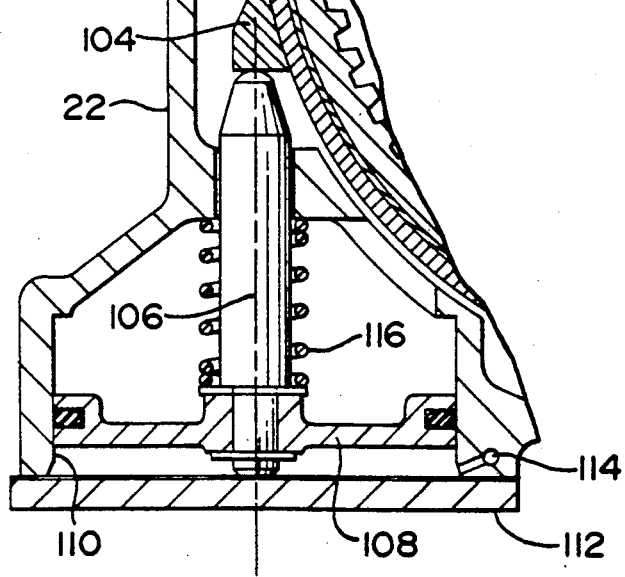
FIG. 5 is a view taken along line 5—5 of FIG. 1.

When the piston 90 is moved to the spring set position (shown in phantom line), the retainer plates 72 and 74 will be positioned so that the control finger 98 of each spring abuts the outer surface of respective rollers 58 at a point substantially tangential with the cam surface 62 of the outer race 50. This is the position shown in FIG. 3. When the springs 64 and 66 are held in this position, the rollers 58 will interact with the cam surface 62 during both directions of attempted rotation of the inner race 56 thereby preventing rotation of the ring gear 28 regardless of the direction of input rotation of the sun gear 26. The ring gear 28 also has associated therewith the double wrap brake band 44 which, as seen in FIG. 5, has one end 100 grounded by a reaction pin 102 secured in the extension housing 22 and the other end 104 selectively controlled by a piston rod 106 which is driven by a pressure operated piston 108 slidably disposed in a cylinder 110 formed in the housing 22.

A cap member 112 seals the cylinder 110 from atmosphere, such that fluid pressure can be admitted through a passage 114 to cause the piston 108 to move upwardly against a return spring 116 to enforce contraction of the brake band 44 on to the surface 42, thereby preventing rotation of the ring gear 28.

From the foregoing description, it will be obvious that the ring gear 28 can be controlled or connected to ground by either the double acting one-way brake 52 or the band brake 44. It is also obvious that the one-way brake 52 can be selectively controlled to permit the one-way operation, thus permitting free wheeling of the ring gear 28 when the sun gear 26 is rotated in the forward direction by the transmission output shaft 18.

When the ring gear 28 is held stationary and the sun gear 26 is rotated in either the forward or reverse direction, the carrier assembly 32 will rotate in the same direction as the sun gear 26, but at a reduced speed determined by the number of teeth on the sun gear 26 and the ring gear 28.

The ring gear 30 meshes with a large diameter gear portion 118 of the stepped pinions 34. A hub 120 is secured to the ring gear 30 and rotatably supported by a support member 122 secured in the differential housing 24.

The hub 120 has formed thereon a spline portion 124 which engages a plurality of friction plates 126 which are components within a disc brake 128. A plurality of friction discs 130 and a back plate 132 are splined to the differential housing 24 and also are components of the disc brake 128. The disc brake 128 has a pressure operated engaging piston 134 which is slidably disposed in the differential housing 24 and selectively operated in a conventional manner by fluid pressure introduced in a cylinder or chamber 136.

When fluid pressure is introduced in the cylinder 136, the piston 134 will move leftward, as viewed in FIG. 1, to cause frictional engagement between the plates 126 and discs 130 to provide securement of the ring gear 30 with the differential housing 24. To disengage the brake 128, a plurality of return springs 138 are provided which will ensure rightward movement of the piston 134 when the fluid pressure in chamber 136 is relieved.

When the brake 128 is engaged and the ring gear 30 is held stationary, the planet carrier assembly 32 will rotate in the same direction as the sun gear 26 but at a reduced speed. The speed of the planet carrier 32 will depend upon the number of teeth on the sun gear 26 and the ring gear 30. Since the ring gear 30 is larger than the ring gear 28, the speed of the carrier 32 will be greater when the ring gear 30 is restrained as compared to the restraining of gear 28 at any given input speed of the sun gear 26. In other words, the ring gear 30 is a high speed reaction member and the ring gear 28 is a low speed reaction member.

The carrier side plate 38 is formed integral with or otherwise secured to the differential carrier 140, which is a component in the differential gear assembly 14. The differential carrier 140 rotates in unison with the carrier assembly 32 and thus will be driven either forwardly or reversely. The direction of rotation will depend on the gear selection in the main transmission. The output will rotate at a speed relative to the speed of transmission output 12, depending upon which of the ring gears 28 or 30 is held stationary.

The differential gear assembly 14 also includes a pair of side gears 142 and 144 and a pair of pinion gears 146. The pinion gears 146 are rotatably supported on the pins 148 which are secured in the differential carrier 140. The side gears 142 and 144 are connected with respective differential output shafts 150 and 152, which in turn, are connected in a conventional manner to the drive wheels of the vehicle.

While the transmission to which the two-speed planetary arrangement is connected can be essentially in any multiratio transmission, a chart shown in FIG. 6 describes the operation of the two-speed planetary gear when combined with a three-speed transmission. As can be discerned from FIG. 6, the roller brake or one-way brake 52 is in a bidirectional mode in Park and Reverse, and is always in the overrunning mode to provide the fourth or highest speed ratio. The higher speed ratio is provided when the main transmission has achieved its highest speed ratio with the two-speed planetary then being shifted from the low to the high ratio.

It is a simple matter to pressurize the cylinder 92 while the main transmission is interchanging between the speed ratios. Thus, when the two-speed planetary 10 is shifted from the low ratio established by ring gear 28 to the high ratio established by ring gear 30, the brake 52 will be conditioned as shown in FIG. 2, thereby permitting overrunning of the ring gear 28. The band brake 44 can be selectively engaged whenever the main transmission is in Reverse or Neutral, or is shifted to a manual forward range to obtain overrun braking. This will ensure that the ring gear 28 will remain stationary during these operations.

The usefulness of the brake 52 as a two-way brake is important during the manipulation of the main transmission to the Park setting. In the Park setting, the transmission output member 12 is held stationary. However, the vehicle will not be held stationary unless there is a ground member formed in the two-speed planetary 10. If the brake 52 were only a one-way device, the vehicle would be free to roll in the forward direction during Park. However, since the brake 52 is conditioned, as shown in FIG. 3, during the Park setting, the ring gear 28 will provide a reaction and therefore prevent inadvertent movement of the vehicle.

FIGS. 7 and 8 provide an alternative embodiment, wherein the brake 52' is a one-way device and therefore will restrain the ring gear 28 from rotation in only one direction. With this embodiment, a disc brake 160 is provided to control the positive grounding of the ring gear 28'. However, to maintain the benefits of utilizing the conventional park gear within the main transmission, a secondary mechanical raking arrangement 161 is provided for the ring gear 28'.

This mechanical braking arrangement 161, best seen in FIG. 8, includes a gear member 162 which is formed on the output surface of the ring gear 28'; and a pawl member 164 which is pivotally disposed in the housing 22 on a pin 166 and urged into engagement with the gear 162 by a spring member 168. A selectively controllable fluid operated piston 170 is provided to control pivoting of the pawl 164 about the pin 166 to enforce disengagement between the pawl 164 and the gear 162. The gear 162 is configured such that during engagement with the pawl 164, rotation in the clockwise direction is restricted while rotation in the counterclockwise direction is permitted due to the angular shape of the pawl 164 engaged with the gear 162.

The similarity between FIGS. 2 and 8 should be appreciated at this point in that at both instances, one-way braking is provided while overrunning is permitted in the opposite direction. The one-way brake 52' will provide reaction for the ring gear 28' whenever the input sun gear 26 is rotated in the reverse direction by the transmission output shaft 18. Thus, the combination of one-way brake 52' and the mechanical brake arrangement 161 provide the same function as the two-way roller brake 52.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A two stage final drive connected between an input shaft and two output shafts comprising: a first gear assembly having an input member drivingly connected with said input shaft, an output member, a first reaction member and a second reaction member; a second gear assembly having an input member drivingly connected with said output member of said first gear assembly and differential gear means drivingly connected with said output shafts; selectively engageable control means for establishing said first reaction member as a bi-directional reaction in said first gear assembly during one phase of operation and as a unidirectional reaction during another phase of operation; and selectively engageable friction means for selectively establishing said second reaction member as a bi-directional reaction during said other phase of operation.

2. The invention defined in claim 1 and further including selectively engageable friction brake means for selectively establishing said fist reaction member as a bi-directional reaction member.

3. A two stage final drive connected between an input shaft and two output shafts comprising: a first gear assembly having an input member drivingly connected with said input shaft, an output member, a first reaction member and a second reaction member; a second gear assembly having an input member drivingly connected with said output member of said first gear assembly and differential gear means drivingly connected with said output shafts; selectively engageable control means for establishing said first reaction member as a bi-directional reaction in said first gear assembly during one phase of operation and as a unidirectional reaction during another phase of operation including inner race means, outer race means, roller means disposed between the race means, spring means for each of the roller means for providing selective two way and one way operation wherein the rollers react to prevent rotation between the races and a control means for positioning the springs in selective locations for providing the operation; and selectively engageable friction means for selectively establishing said second reaction member as a bi-directional reaction during said other phase of operation.

4. The invention defined in claim 3 and further including selectively engageable friction brake means for selectively establishing said first reaction member as a bi-directional reaction member.

5. A two stage final drive connected between an input shaft and two output shafts comprising: a first gear assembly having an input member drivingly connected with said input shaft, an output member, a first reaction member and a second reaction member; a second gear assembly having an input member drivingly connected with said output member of said first gear assembly and differential gear means drivingly connected with said output shafts; selectively engageable control means for establishing said first reaction member as a bi-directional reaction in said first gear assembly during one phase of operation and as a unidirectional reaction during another phase of operation including roller clutch means for providing braking in one direction and mechanical pawl and tooth means for selectively providing one way braking in the other direction including spring actuating means for enforcing engagement of said pawl and tooth means and selectively actuatable fluid operated piston means for enforcing disengagement of said pawl and tooth means for preventing braking operation thereby; and selectively engageable friction means for selectively establishing said second reaction member as a bi-directional reaction during said other phase of operation.

6. The invention defined in claim 5 and further including selectively engageable friction brake means for selectively establishing said first reaction member as a bi-directional reaction member.

* * * * *